United States Patent
Sheel

(10) Patent No.: US 9,973,497 B2
(45) Date of Patent: May 15, 2018

(54) SYSTEM AND METHOD FOR COMMUNICATION TO ENTERPRISE ENVIRONMENT USERS OF A MOBILE APPLICATION BY THE MOBILE APPLICATION PROVIDER

(71) Applicant: SAP SE, Walldorf (DE)

(72) Inventor: Vinay Sheel, Patna (IN)

(73) Assignee: SAP SE, Walldorf (DE)

( * ) Notice: Subject to any disclaimer, the term of this patent is extended or adjusted under 35 U.S.C. 154(b) by 127 days.

(21) Appl. No.: 14/959,528

(22) Filed: Dec. 4, 2015

(65) Prior Publication Data
US 2017/0163634 A1 Jun. 8, 2017

(51) Int. Cl.
*H04L 29/06* (2006.01)
*H04L 29/08* (2006.01)
*G06F 9/445* (2018.01)

(52) U.S. Cl.
CPC ...... *H04L 63/0853* (2013.01); *H04L 63/0807* (2013.01); *H04L 63/0876* (2013.01); *H04L 67/34* (2013.01); *G06F 9/44505* (2013.01)

(58) Field of Classification Search
CPC .............................. H04L 67/34; H04L 9/44505
See application file for complete search history.

(56) References Cited

U.S. PATENT DOCUMENTS

| | | | | |
|---|---|---|---|---|
| 8,935,321 | B1 * | 1/2015 | Sankaranarayanan | G06F 8/36 707/802 |
| 9,712,492 | B1 * | 7/2017 | Kim | H04L 63/0272 |
| 2005/0216906 | A1 * | 9/2005 | Shahindoust | H04L 63/20 717/171 |
| 2005/0289536 | A1 * | 12/2005 | Nayak | G06F 8/61 717/174 |

(Continued)

OTHER PUBLICATIONS

No stated author; Amazon Simple Notification Service Developer Guide API Version Mar. 31, 2010; 2014; Retrieved from the Internet <URL: https://web-beta.archive.org/web/20140930103845/http://aws.amazon.com/documentation/sns/>; pp. 1-190 as printed.*

*Primary Examiner* — Saleh Najjar
*Assistant Examiner* — Michael W Chao
(74) *Attorney, Agent, or Firm* — Buckley, Maschoff & Talwalkar LLC

(57) ABSTRACT

A method for communicating with enterprise users of an enterprise mobile application on a mobile communication device includes providing the enterprise mobile application to a distribution platform server for downloading to memory of a plurality of mobile communication devices. Including in the enterprise mobile application instructions to connect to the application distribution platform server, and to cause a respective device identifier token to be downloaded to the memory of the mobile communication device, where the device identifier token is specific to that instantiation of the downloaded enterprise mobile application. Where an enterprise mobile application developer and/or provider uses the (Continued)

respective device identifier token to address a message to respective ones of a plurality of mobile communication devices at about the same time. A system and a non-transitory computer-readable medium for implementing the method are also disclosed.

11 Claims, 2 Drawing Sheets

(56) References Cited

U.S. PATENT DOCUMENTS

| | | | |
|---|---|---|---|
| 2008/0040490 A1* | 2/2008 | Karlberg | G06F 8/61 709/228 |
| 2012/0129503 A1* | 5/2012 | Lindeman | H04W 4/001 455/414.1 |
| 2013/0167143 A1* | 6/2013 | Yi | G06F 8/61 717/178 |
| 2014/0040979 A1* | 2/2014 | Barton | H04L 63/20 726/1 |
| 2014/0059525 A1* | 2/2014 | Jawa | G06F 21/53 717/162 |
| 2014/0177839 A1* | 6/2014 | Wagner | H04L 9/0822 380/259 |
| 2014/0281506 A1* | 9/2014 | Redberg | H04L 63/067 713/159 |
| 2014/0283092 A1* | 9/2014 | Mowatt | G06F 21/105 726/26 |
| 2014/0298420 A1* | 10/2014 | Barton | H04L 63/10 726/4 |
| 2015/0089577 A1* | 3/2015 | Beckman | H04L 63/105 726/1 |
| 2015/0249617 A1* | 9/2015 | Chang | H04L 47/70 709/225 |
| 2015/0334165 A1* | 11/2015 | Arling | G05B 15/02 717/177 |
| 2016/0050193 A1* | 2/2016 | Kanov | H04W 12/06 726/7 |
| 2018/0026827 A1* | 1/2018 | Dabbiere | G06F 21/6218 |
| 2018/0041588 A1* | 2/2018 | Straub | H04L 67/2814 |
| 2018/0049026 A1* | 2/2018 | Mistry | H04L 63/083 |

* cited by examiner

SYSTEM AND METHOD FOR COMMUNICATION TO ENTERPRISE ENVIRONMENT USERS OF A MOBILE APPLICATION BY THE MOBILE APPLICATION PROVIDER

BACKGROUND

Mobile applications ("app") are computer programs designed to run on mobile communication devices (e.g., smartphones, tablet computers, personal devices, etc.). A mobile app not preinstalled on the mobile communication device (or herein "mobile device") is typically available from an application distribution platform accessible over, for example, the Internet. The application distribution platform is often operated by the owner of the mobile device's operating system (e.g., Apple's App Store, Google's Play Store, Window's Phone Store, etc.).

In enterprise environments, the mobile app can be made available to enterprise mobile devices through an enterprise server connected to the enterprise environment. In an enterprise server deployment, a user has downloaded the mobile app from the application distribution platform, but communication with the mobile app is by an enterprise server for private deployment of upgrades, updates, messages, etc.

Mobile apps can require updates to address software bugs (to make sure the app is working as designed), and provide upgrade(s) to the program itself (to enhance and/or expand operations). In other instances, the mobile app developer might need to provide critical messages to end-users of their mobile app. For mobile apps independent users of mobile apps downloaded from the operating system owner's app distribution platform, mobile app developers can push updates to end-user mobile devices.

For mobile apps obtained in an enterprise server deployment scenario, the mobile app developer has no way to push any data (i.e., updates, upgrades, critical messages) to all users of the mobile app. It is difficult should an app developer want to communicate to all enterprise users in real time. For instance, the app developer would not have e-mail address of all end-users who downloaded the mobile app.

By way of example, consider that a mobile app developer found a serious flaw in an uploaded mobile app version. The mobile app developer would not want any existing users to update to this new version. Conventionally, the app developer contacts users by known e-mail addresses (which might not reach the full user community); the app developer can arrange a conference call at a predetermined time and date (which also might not reach the full user community); and/or the app developer can publish release notes disseminated throughout the enterprise notifying users of the issue (which again might not reach the full user community). These modes of communication each, and collectively, have the possibility of not reaching all users of the mobile app. Additionally, there is a delay between the availability of the problematic app version release and the receipt of the communication to not access this problematic app version.

DESCRIPTION

In accordance with embodiments, systems and methods provide mobile app developers with the ability to communicate upgrades, updates, and/or critical message to all enterprise users of the mobile app on a mobile communication device in real time. The mobile app is bundled with a demonstration connection that is directed to the mobile app developer server. After being downloaded to the mobile communication device, the first time a particular instantiation of the mobile app is launched on a user's mobile communication device, that instantiation of the mobile app makes a call to the mobile device's operating system application distribution platform. The user can consent to their instantiation of the mobile app connecting to the demonstration server administered by the mobile app developer. After connection to the demonstration server, the mobile app can send a unique device token to the demonstration server identifying the particular instantiation of the mobile app installed on the mobile device. Subsequently when the mobile app developer communicates to all users of the mobile app, the demonstration server administrator can push notifications to all (enterprise and independent) users globally in real time by addressing the notification to all of the device tokens registered with the demonstration server.

Figure 1:
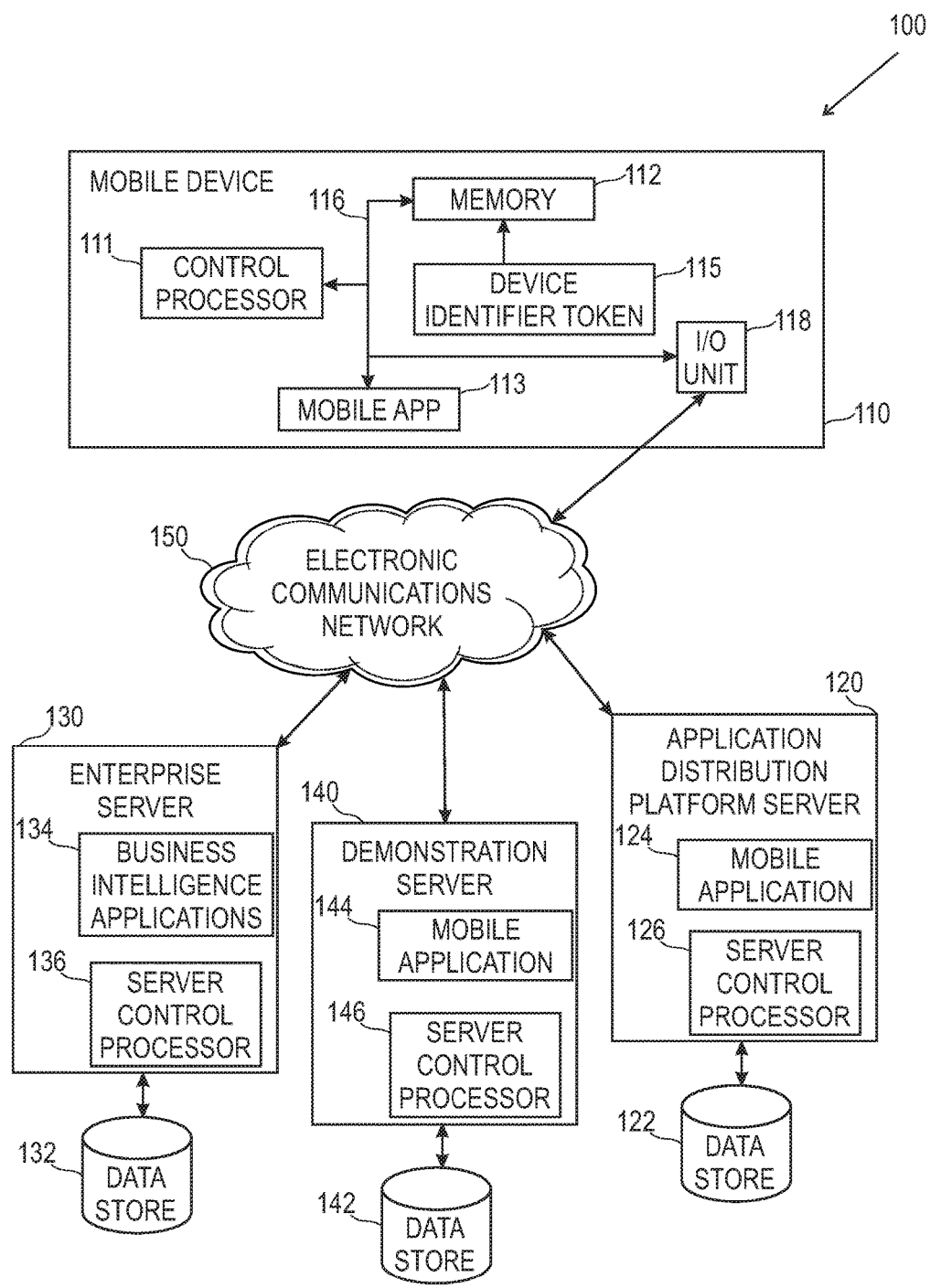
FIG. 1 depicts a block diagram of a mobile device system in accordance with embodiments.

FIG. 1 depicts mobile device system 100 in accordance with some embodiments. An embodying mobile device system includes mobile device 110, application distribution platform server 120, enterprise server 130, demonstration server 140. The mobile device and each of servers 120, 130, 140 communicate across electronic communication network 150. For purposes of discussion, FIG. 1 depicts a single mobile device and a single enterprise environment, although embodiments are not so limited.

Electronic communication network 150 can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 150.

Mobile device 110 includes control processor 111 running computer executable instructions to implement one or more mobile app 113. The instantiation of the mobile app(s) can be stored in memory 112. Device identifier token 115 can also be stored in memory 112. This device identifier token is specific for a particular instantiation of the mobile app installed on a particular mobile device. The mobile device can include input/output (I/O) unit 118 that communicates across electronic communication network 150. Internal data bus 116 interconnects the control processor, the mobile apps, memory, and the I/O unit.

The control processor may be a processing unit, a field programmable gate array, discrete analog circuitry, digital circuitry, an application specific integrated circuit, a digital signal processor, a reduced instruction set computer processor, etc.

Application distribution platform (ADP) server 120 can be operated by an owner of the mobile device's operating system. ADP server 120 can include a repository of one or more mobile app(s) 124 that can be downloaded to a mobile device. Operation, communication and other functions of the ADP server can be performed under the control of server control processor 126. The ADP server is in communication with data store 122, where executable program code can be stored. The repository of mobile apps can also be contained within data store 122.

Demonstration server 140 can be operated by a mobile app developer and/or provider. Demonstration server 140 can include a repository of one or more mobile app(s) 144 that can be downloaded to a mobile device. Operation, communication and other functions of the demonstration server can be performed under the control of server control processor 146. The demonstration server is in communication with data store 142, where executable program code can be stored. The repository of mobile apps can also be contained within data store 142. In accordance with some implementations, in an enterprise environment the repository of mobile apps can be resident on enterprise data store 142.

Enterprise server 140 can be operated by a mobile app developer and/or provider. Enterprise server 140 can include a repository of one or more business intelligence application 144, which can include mobile apps that can be downloaded to a mobile device. Operation, communication and other functions of the enterprise server can be performed under the control of server control processor 146. The enterprise server is in communication with data store 142, where executable program code can be stored. The repository of mobile apps can also be contained within data store 142.

For purposes of this disclosure, the term "enterprise deployment scenario" is used to describe the following actions. A mobile app provider/developer uploads a mobile app to the ADP server. A user can access the ADP server from anywhere to download and/or update a mobile app on their mobile device. To use the application in the enterprise environment, the user's mobile device needs to communicate with a backend server (i.e., enterprise server 130) provided by the enterprise. An administrator of the enterprise server manages the deployment and accessibility of the mobile app to the enterprises' premise server(s), so that the mobile app can interact with data resident through the premise server(s).

In accordance with embodiments, an enterprise mobile app includes a demonstration server connection bundled in the mobile app. After a user installs the enterprise mobile app on their mobile device, the user can connect to the demonstration server and view documents and/or data stored at the demonstration server. This demonstration connection between the enterprise mobile app resident on a user's mobile device and the demonstration server can be managed by an administrator of the demonstration server.

In accordance with embodiments, the demonstration server can receive a device token unique to each specific instantiation of an enterprise mobile app. In some implementations, when an instantiation of a mobile app is launched after installation and/or upgrade on a mobile communication device, an alert message can be presented to the user. This alert message can query the user as to whether the user wants to receive communications from the mobile app developer and/or provider. If the user consents to receiving the communications, the mobile app sends a unique device token (i.e., a token unique to that instantiation of the mobile app resident on that particular mobile communication device) to demonstration server 140.

This unique device token can be stored in data store 142 in communication with the demonstration server. When a mobile app provider/developer needs to communicate with each mobile app user, an update, upgrade, critical message, etc. can be directed to the mobile device by addressing the unique device token identifying the specific instantiation of the mobile app installed on that mobile device.

Figure 2:
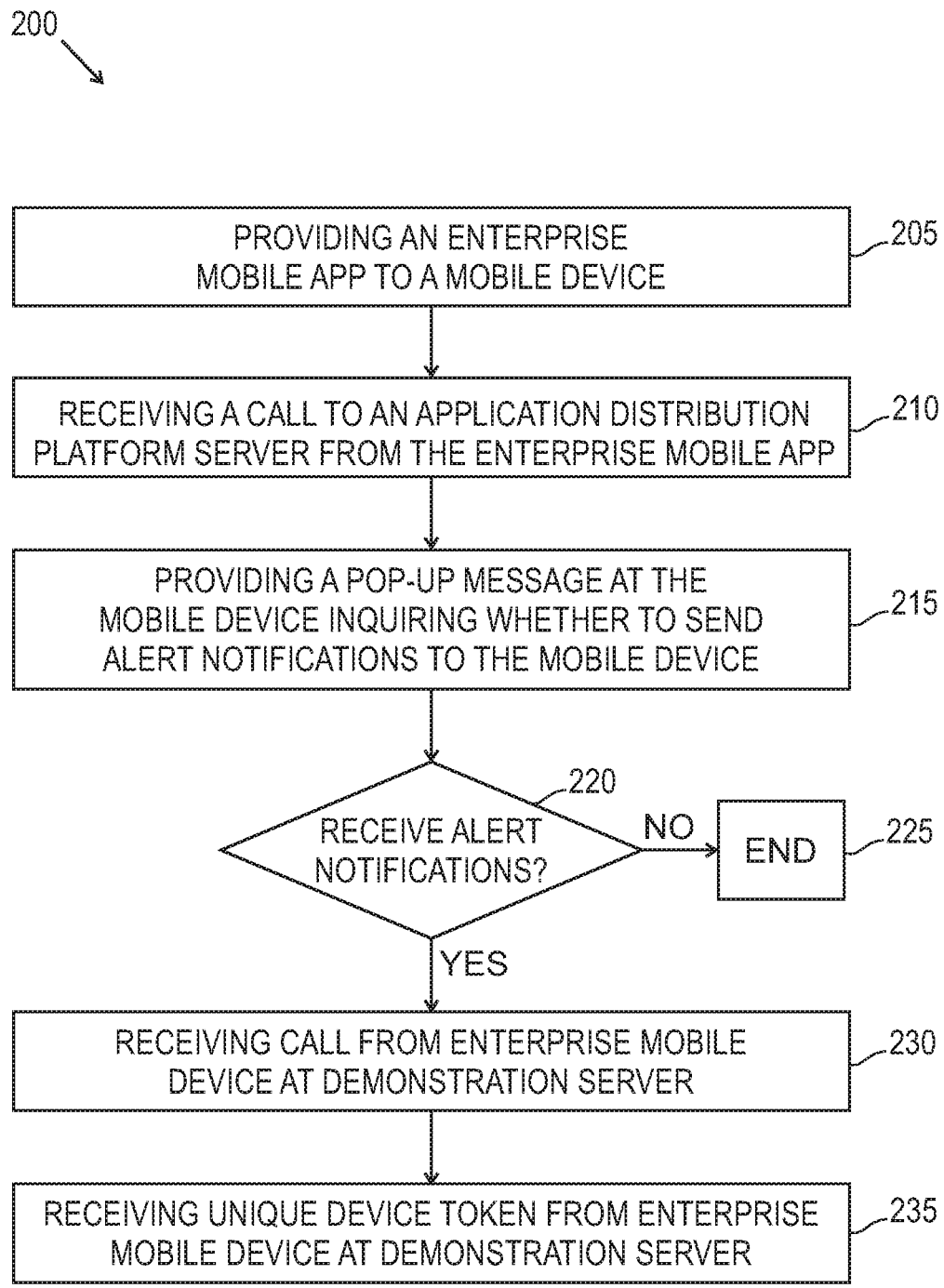
FIG. 2 depicts a process for obtaining a unique device token from mobile device in accordance with embodiments.

FIG. 2 depicts process 200 for obtaining a unique device token from a mobile device in accordance with embodiments. An enterprise mobile app is provided, step 205, to a mobile device. In accordance with implementations, the enterprise mobile app can be provided from ADP server 120 by a user downloading the enterprise mobile app.

In accordance with embodiments, when the enterprise mobile app is launched, a call is made to ADP server 120, step 210, to obtain device identifier token 115. This device identifier token is specific for that instantiation of the enterprise mobile app downloaded to the particular mobile device. This call to the ADP server can be made the first time the mobile app is launched on the mobile device. In some embodiments, the user can assent to the call to obtain the device token. In some implementations, the call can be postponed, and/or manually initiated by the mobile device user.

A pop-up message is provided, step 215, at the enterprise mobile device. The message inquires as to whether the user wants to receive alert messages from the enterprise mobile app provider/developer. If the user declines, step 220, process 200 terminates, step 225. If the user accepts, step 220, a connection is made at demonstration server 140, step 230, from a call received from the enterprise mobile device. After the demonstration server connection is established with the mobile device, the demonstration server receives, step 235, the device identifier token specific for that instantiation of the enterprise mobile app installed on that mobile device. The device identifier token is a globally unique token assigned for a particular instantiation of the mobile app installed on a particular mobile communication device. Accordingly, the device identifier token is sufficient for a push notification server to address the communication (e.g., updates, upgrades, critical messages, etc.) to the mobile communication device containing that instantiation of the mobile app worldwide.

In accordance with embodiments, the enterprise mobile app provider/developer can communicate with a specific mobile device using the device identifier token, even if that specific mobile device is an enterprise mobile device. The communication can be a broadcast push message sent from a push server to all registered users of the mobile app. The users can receive the push message in real time, after the demonstration server administrator sends the message.

The push message can be one of several purposes. Some non-limiting examples can include (1) notifying users of instability and/or program bugs in the mobile app; (2) notifying users of critical issues in upgrading to latest revision of the mobile app; (3) notifying users of incompatibilities between the installed enterprise mobile app and an updated software development kit ("SDK") for the mobile device's operating system; (4) notifying users of a workaround to address detected problems in the enterprise mobile app; (5) pushing enterprise mobile app configuration changes to be installed; and (6) providing upcoming product release presentations to users of the mobile app.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as providing mobile app developers with the ability to communicate upgrades, updates, and/or critical message to all enterprise users of the mobile app in real time, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for communicating with enterprise users of an enterprise mobile application on a mobile communication device, the method comprising:
    providing the enterprise mobile application to a mobile application distribution platform server, the enterprise mobile application available for downloading to memory of a plurality of mobile communication devices;
    including in the enterprise mobile application computer executable instructions to connect a respective one of the plurality of mobile communication devices to the application distribution platform server;
    the computer executable instructions including instructions causing a respective device identifier token to be downloaded from the application distribution platform server to the memory of the respective one of the plurality of mobile communication devices, the respective device identifier token identifying a particular specific instantiation of the enterprise mobile application downloaded to the respective one of the plurality of mobile communication devices; and
    one of an enterprise mobile application developer and an enterprise mobile application provider using the respective device identifier token to push-communicate at least one of a configuration update and upgrade of the enterprise mobile application to the respective one of the plurality of mobile communication devices.

2. The method of claim 1, including the respective device identifier token being specific to an instantiation of the enterprise mobile application downloaded to the respective one of the plurality of mobile communication devices.

3. The method of claim 1, including:
    performing the providing step including uploading the enterprise mobile application to the mobile application distribution platform server by one of an enterprise mobile application developer and an enterprise mobile application provider;
    the computer executable instructions including instructions to connect the respective one of the plurality of mobile communication devices to a demonstration server of the enterprise mobile application developer or provider; and
    receiving at the demonstration server the respective device identifier token from the respective one of the plurality of mobile communication devices.

4. The method of claim 1, including push-communicating at least one of the configuration update and the upgrade of the enterprise mobile application to a plurality of mobile communication devices at about the same time using a plurality of respective device identifier tokens.

5. A non-transitory computer-readable medium having stored thereon instructions which when executed by a processor cause the processor to perform a method for communicating with enterprise users of an enterprise mobile application on a mobile communication device, the method comprising:
    providing the enterprise mobile application to a mobile application distribution platform server, the enterprise mobile application available for downloading to memory of a plurality of mobile communication devices;
    including in the enterprise mobile application computer executable instructions to connect a respective one of the plurality of mobile communication devices to the application distribution platform server;
    the computer executable instructions of the enterprise mobile application including instructions causing a respective device identifier token to be downloaded from the application distribution platform server to the memory of the respective one of the plurality of mobile communication devices, the respective device identifier token identifying a particular specific instantiation of the enterprise mobile application downloaded to the respective one of the plurality of mobile communication devices; and
    one of an enterprise mobile application developer and an enterprise mobile application provider using the respective device identifier token to push-communicate at least one of a configuration update and upgrade of the enterprise mobile application to the respective one of the plurality of mobile communication devices.

6. The non-transitory computer-readable medium of claim 5, including instructions to cause the processor to provide a respective device identifier token specific to an instantiation of the enterprise mobile application downloaded to the respective one of the plurality of mobile communication devices.

7. The non-transitory computer-readable medium of claim 5, including instructions to cause the processor to:
    perform the providing step including uploading the enterprise mobile application to the mobile application distribution platform server by one of an enterprise mobile application developer and an enterprise mobile application provider;
    the computer executable instructions of the enterprise mobile application including instructions to connect the respective one of the plurality of mobile communication devices to a demonstration server of the enterprise mobile application developer or provider; and
    receive at the demonstration server the respective device identifier token from the respective one of the plurality of mobile communication devices.

8. The non-transitory computer-readable medium of claim 5, including instructions to cause the processor to push-communicate at least one of the configuration update and the upgrade of the enterprise mobile application to a plurality of mobile communication devices at about the same time using a plurality of respective device identifier tokens.

9. A system for communicating with enterprise users of an enterprise mobile application on a mobile communication device, the system comprising:
   an application distribution platform server in communication with a data store containing the enterprise mobile application, the application distribution platform server connected to an electronic communication network;
   the mobile communication device configured to download an instantiation of the enterprise mobile application through the application distribution platform server to a memory unit of the mobile communication device; and
   the enterprise mobile application including computer executable instructions that cause a control processor of the mobile communication device to connect to the application distribution platform server and obtain a respective device identifier token unique to that instantiation of the enterprise mobile application downloaded to the mobile communication device, the respective device identifier token identifying a particular specific instantiation of the enterprise mobile application downloaded to the respective one of the plurality of mobile communication devices; and
   the application distribution platform server configured to use the respective device identifier token to push-communicate at least one of a configuration update and upgrade of the enterprise mobile application to the respective one of the plurality of mobile communication devices.

10. The system of claim 9, including:
   a demonstration server in communication with the electronic communication network, the demonstration server configured to provide the enterprise mobile application to the application distribution platform server; and
   the demonstration server configured to receive a communication from the mobile communication device, the communication including the respective device identifier token.

11. The system of claim 10, including the demonstration server configured to push communicate the at least one of a configuration update and upgrade of the enterprise mobile application to a plurality of mobile communication devices using a plurality of respective device identifier tokens, each respective device identifier token identifying a particular specific instantiation of the enterprise mobile application downloaded to a respective one of the mobile communication devices.

* * * * *